(12) United States Patent
Zhang et al.

(10) Patent No.: US 11,733,487 B2
(45) Date of Patent: Aug. 22, 2023

(54) OPTICAL IMAGING LENS ASSEMBLY

(71) Applicant: ZHEJIANG SUNNY OPTICAL CO., LTD., Ningbo (CN)

(72) Inventors: Jiaying Zhang, Ningbo (CN); Fujian Dai, Ningbo (CN); Liefeng Zhao, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 309 days.

(21) Appl. No.: 16/943,608

(22) Filed: Jul. 30, 2020

(65) Prior Publication Data

US 2021/0048637 A1 Feb. 18, 2021

(30) Foreign Application Priority Data

Aug. 12, 2019 (CN) .......................... 201910740202.2

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC ........ G02B 9/62; G02B 9/64; G02B 13/0045; G02B 27/0025; G02B 15/146; H04N 5/222; H04N 5/2254
USPC ......... 359/656–658, 708, 713, 749, 756–762
See application file for complete search history.

(56) References Cited

U.S. PATENT DOCUMENTS

| 2016/0195702 A1* | 7/2016 | Lee | .......................... G02B 9/62 |
| | | | 359/713 |
| 2016/0282588 A1* | 9/2016 | Sekine | ............... G02B 13/0045 |
| 2019/0265438 A1* | 8/2019 | Sekine | ..................... G02B 9/62 |

FOREIGN PATENT DOCUMENTS

| CN | 208521053 U | 2/2019 |
| CN | 209102995 U | 7/2019 |
| CN | 110426819 A | 11/2019 |

OTHER PUBLICATIONS

First Examination Report issued in corresponding Indian Patent Application No. 202014032684; dated Jul. 29, 2021; 5 pgs.

* cited by examiner

*Primary Examiner* — Travis S Fissel
(74) *Attorney, Agent, or Firm* — Hauptman Ham, LLP

(57) ABSTRACT

The present disclosure discloses an optical imaging lens assembly including, sequentially from an object side to an image side along an optical axis, a first lens having positive refractive power with a convex object-side surface; a second lens having refractive power; a third lens having refractive power; a fourth lens having refractive power with a convex object-side surface and a concave image-side surface; a fifth lens having positive refractive power; and a sixth lens having negative refractive power with a convex object-side surface, wherein a distance TTL along the optical axis from the object-side surface of the first lens to an imaging plane of the optical imaging lens assembly, half of a diagonal length ImgH of an effective pixel area on the imaging plane, and half of a maximal field-of-view Semi-FOV of the optical imaging lens assembly satisfy TTL/ImgH<1.6, and 4.5 mm<f*tan(Semi-FOV)<7 mm.

17 Claims, 9 Drawing Sheets

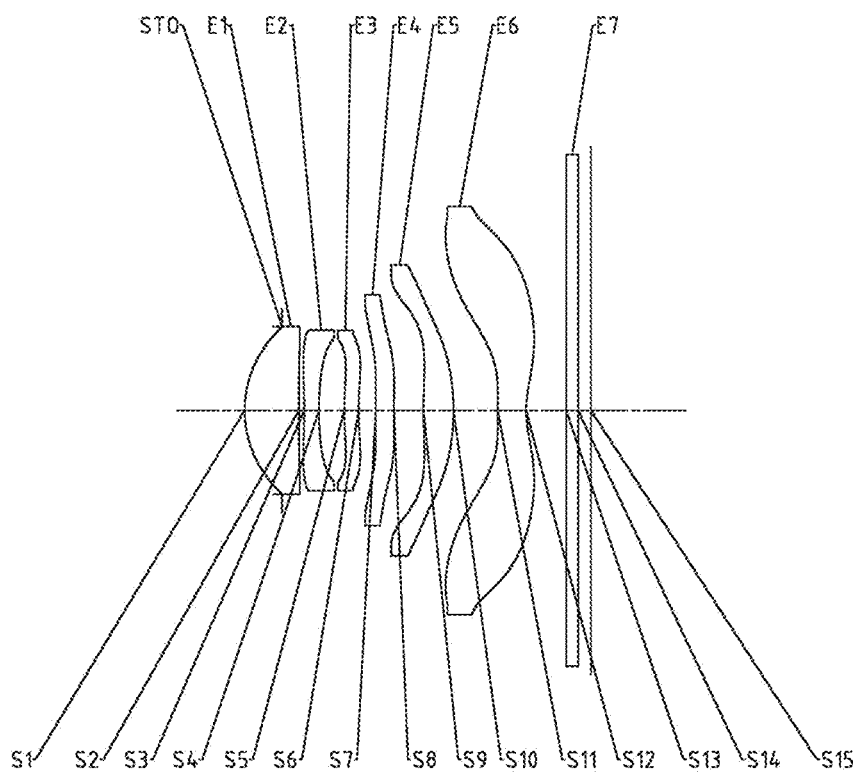
Fig. 1
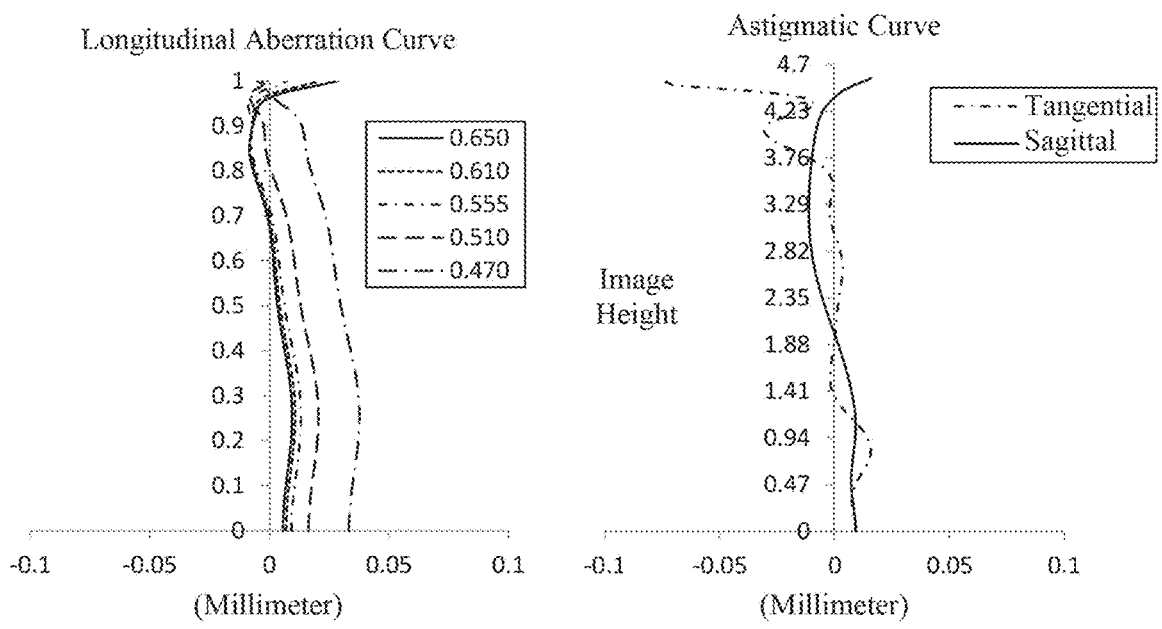
Fig. 2A
Fig. 2B

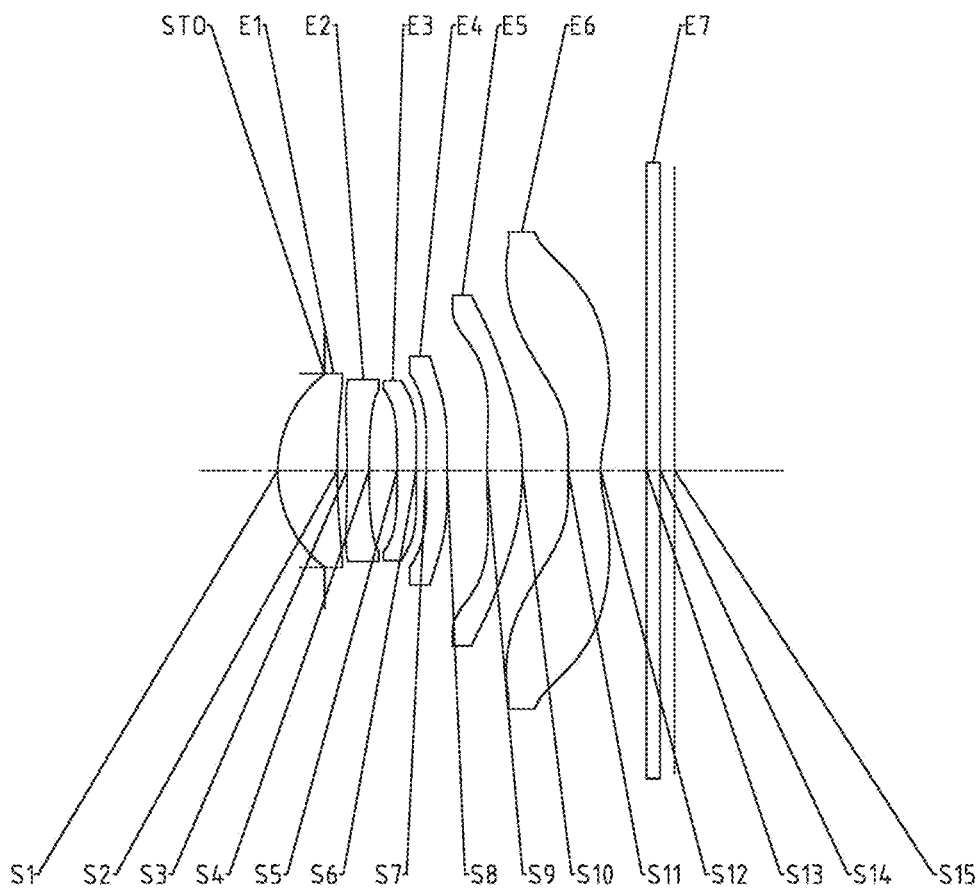
Fig. 5
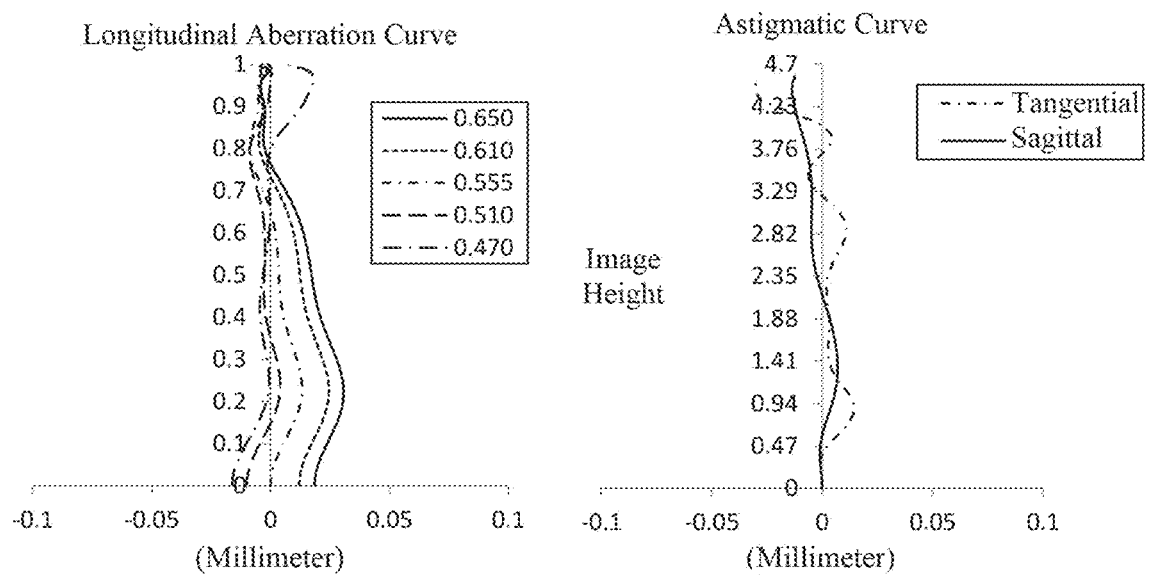
Fig. 6A
Fig. 6B

OPTICAL IMAGING LENS ASSEMBLY

CROSS-REFERENCE TO RELATED APPLICATION

This application claims benefit of priority to Chinese Patent Application No. 201910740202.2 filed on Aug. 12, 2019 before the China National Intellectual Property Administration, the entire disclosure of which is incorporated herein by reference in its entity.

TECHNICAL FIELD

The present disclosure relates to an optical imaging lens assembly, and more specifically, relates to an optical imaging lens assembly including six lenses.

BACKGROUND

With the rapid development of electronic products, imaging lens assemblies have become more and more widely used. On the one hand, as portable electronic products are gradually becoming lighter and thinner, the imaging lens assemblies thereof are not only required to have good image quality, but also the characteristics of lightness and thinness, so as to effectively reduce the thickness of portable electronic products. On the other hand, people have put forward higher and higher requirements on the image quality of the imaging lens assemblies of the portable electronic products.

With the advancement of semiconductor manufacturing technology and the continuous reduction of the pixel size of photosensitive elements, imaging lens assemblies mounted on portable electronic products, such as mobile phones or digital cameras, gradually tend to be miniaturized, large field-of-view, high pixels, and so on. A common imaging lens assembly needs to employ a large-diameter configuration in order to meet high pixels and a large field-of-view. The large-diameter configuration causes the lens size to be relatively large, so the imaging lens assembly will be difficult to match the high-pixel sensor chip well. In addition, when the field-of-view is increased, the distortion will increases and the exit angle of the chief ray will be too large, making the lens resolution insufficient.

In order to meet the development needs of the market, the total length of the optical imaging lens assembly needs to be shortened as much as possible. By reducing the number of lenses, the total length of the lens assembly may be effectively shortened. However, the lack of design freedom caused by the reduction of lenses will result in a significant increase in design difficulty and difficulty in meeting high-quality imaging requirements.

SUMMARY

In one aspect, the present disclosure provides an optical imaging lens assembly which includes, sequentially from an object side to an image side along an optical axis, a first lens having positive refractive power with a convex object-side surface; a second lens having refractive power; a third lens having refractive power; a fourth lens having refractive power with a convex object-side surface and a concave image-side surface; a fifth lens having positive refractive power; and a sixth lens having negative refractive power with a convex object-side surface.

In one embodiment, a distance TTL along the optical axis from the object-side surface of the first lens to an imaging plane of the optical imaging lens assembly and half of a diagonal length ImgH of an effective pixel area on the imaging plane of the optical imaging lens assembly may satisfy TTL/ImgH<1.6.

In one embodiment, a total effective focal length f of the optical imaging lens assembly and half of a maximal field-of-view Semi-FOV of the optical imaging lens assembly may satisfy 4.5 mm<f*tan(Semi-FOV)<7 mm.

In one embodiment, a total effective focal length f of the optical imaging lens assembly and an entrance pupil diameter EPD of the optical imaging lens assembly may satisfy f/EPD<1.9.

In one embodiment, a center thickness CT1 of the first lens along the optical axis and an edge thickness ET1 of the first lens may satisfy: 0.2<ET1/CT1<0.7.

In one embodiment, a distance SAG42 along the optical axis from an intersection of the image-side surface of the fourth lens and the optical axis to a vertex of an effective radius of the image-side surface of the fourth lens and a distance SAG52 along the optical axis from an intersection of an image-side surface of the fifth lens and the optical axis to a vertex of an effective radius of the image-side surface of the fifth lens may satisfy: 0.1<SAG42/SAG52<0.6.

In one embodiment, a center thickness CT4 of the fourth lens along the optical axis and an edge thickness ET4 of the fourth lens may satisfy: 0.5<ET4/CT4<1.

In one embodiment, a total effective focal length f of the optical imaging lens assembly and an effective focal length f5 of the fifth lens may satisfy: 0.7<f/f5<1.2.

In one embodiment, an effective focal length f2 of the second lens and an effective focal length f6 of the sixth lens may satisfy: 0<f6/f2<1.

In one embodiment, an effective focal length f1 of the first lens and a radius of curvature R1 of the object-side surface of the first lens may satisfy: 0.2<R1/f1<0.7.

In one embodiment, a radius of curvature R7 of the object-side surface of the fourth lens and a radius of curvature R8 of the image-side surface of the fourth lens may satisfy: 0.5<R7/R8<1.5.

In one embodiment, an effective focal length f5 of the fifth lens and a radius of curvature R10 of an image-side surface of the fifth lens may satisfy: −1.2<R10/f5<−0.2.

In one embodiment, an effective focal length f6 of the sixth lens, a radius of curvature R11 of the object-side surface of the sixth lens and a radius of curvature R12 of an image-side surface of the sixth lens may satisfy: 0.1<f6/(R12−R11)<0.6.

In one embodiment, a center thickness CT2 of the second lens along the optical axis and a spaced interval T23 between the second lens and the third lens along the optical axis may satisfy: 0.5<CT2/T23<1.

In one embodiment, a spaced interval T45 between the fourth lens and the fifth lens along the optical axis and a spaced interval T56 between the fifth lens and the sixth lens along the optical axis may satisfy: 0.5<T45/T56<1.

In one embodiment, a center thickness CT3 of the third lens along the optical axis and a center thickness CT5 of the fifth lens along the optical axis may satisfy: 0.2<CT3/CT5<0.7.

In one embodiment, an image-side surface of the third lens may be a concave surface.

In one embodiment, the fifth lens may have positive refractive power, and an image-side surface thereof may be a convex surface.

In one embodiment, the sixth lens may have negative refractive power, the object-side surface thereof may be a convex surface and an image-side surface thereof may be a concave surface.

The present disclosure employs six lenses, and the optical imaging lens assembly has at least one advantageous effect such as large image plane, large aperture and ultra-thin and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting examples with reference to the following drawings:

FIG. 1 illustrates a schematic structural view of an optical imaging lens assembly according to Example 1 of the present disclosure;

FIGS. 2A to 2D illustrate a longitudinal aberration curve, an astigmatic curve, a distortion curve, and a lateral color curve of the optical imaging lens assembly of the Example 1, respectively;

FIG. 5 illustrates a schematic structural view of an optical imaging lens assembly according to Example 3 of the present disclosure;

FIGS. 6A to 6D illustrate a longitudinal aberration curve, an astigmatic curve, a distortion curve, and a lateral color curve of the optical imaging lens assembly of the Example 3, respectively;

DETAILED DESCRIPTION OF EMBODIMENTS

Figures 2C, 2D:
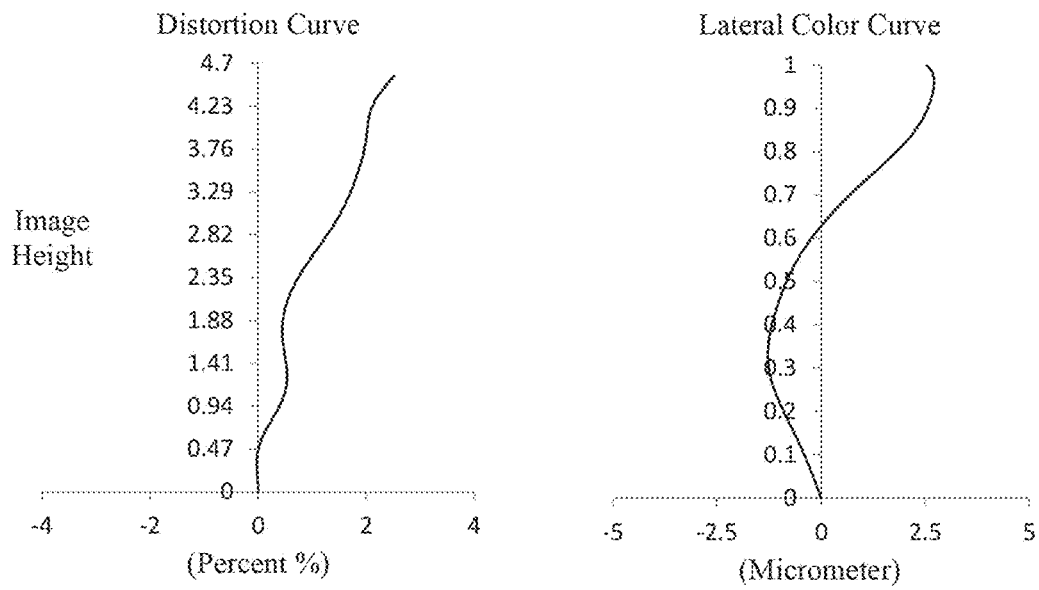

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, six lenses having refractive power, which are a first lens, a second lens, a third lens, a fourth lens, a fifth lens and a sixth lens, respectively. The six lenses are arranged sequentially from an object side to an image side along an optical axis. Among the first lens to the sixth lens, there may be an air interval between each two adjacent lenses.

In an exemplary embodiment, the first lens may have positive refractive power, an object-side surface thereof may be a convex surface; the second lens has positive or negative refractive power; the third lens has positive or negative refractive power; the fourth lens has positive or negative refractive power, an object-side surface thereof may be a convex surface, and an image-side surface thereof may be a concave surface; the fifth lens may have positive refractive power; and the sixth lens may have negative refractive power, and an object-side surface thereof may be a convex surface. Reasonably assigning the surface shape and the refractive power of each lens is beneficial to make the optical imaging lens assembly have ultra-thin characteristics.

In an exemplary embodiment, the optical imaging lens assembly according to the present disclosure may satisfy: TTL/ImgH<1.6, where TTL is a distance along the optical axis from the object-side surface of the first lens to an imaging plane of the optical imaging lens assembly and ImgH is half of a diagonal length of an effective pixel area on the imaging plane of the optical imaging lens assembly. More specifically, TTL and ImgH may further satisfy: TTL/ImgH<1.4. Satisfying TTL/ImgH<1.6 may be beneficial to achieve the ultra-thin and high-pixel characteristics of the optical imaging lens assembly.

In an exemplary embodiment, the optical imaging lens assembly according to the present disclosure may satisfy: 4.5 mm<f*tan(Semi-FOV)<7 mm, where f is a total effective focal length of the optical imaging lens assembly and Semi-FOV is half of a maximal field-of-view of the optical imaging lens assembly. More specifically, f and Semi-FOV may further satisfy: 4.5 mm<f*tan(Semi-FOV)<5 mm. For example, 4.5 mm<f*tan(Semi-FOV)<4.7 mm. Satisfying 4.5 mm<f*tan(Semi-FOV)<7 mm may be beneficial to achieve the large imaging plane characteristics of optical imaging lens assembly.

In an exemplary embodiment, the optical imaging lens assembly according to the present disclosure may satisfy: f/EPD<1.9, where f is a total effective focal length of the optical imaging lens assembly and EPD is an entrance pupil diameter of the optical imaging lens assembly. More specifically, f and EPD may further satisfy: f/EPD<1.86. Satisfying f/EPD<1.9 may make the aperture number of the large image plane imaging lens assembly smaller, ensure the imaging lens assembly has a large aperture imaging effect, and thereby make the lens assembly have good imaging quality in a dark environment.

In an exemplary embodiment, the optical imaging lens assembly according to the present disclosure may satisfy: 0.2<ET1/CT1<0.7, where CT1 is a center thickness of the first lens along the optical axis and ET1 is an edge thickness of the first lens. More specifically, CT1 and ET1 may further satisfy: 0.25<ET1/CT1<0.50. Satisfying 0.2<ET1/CT1<0.7 may reasonably adjust the distortion amount of the optical imaging lens assembly, so as to ensure that the first lens has good workability in the post-processing process.

In an exemplary embodiment, the optical imaging lens assembly according to the present disclosure may satisfy: 0.1<SAG42/SAG52<0.6, where SAG42 is a distance along the optical axis from an intersection of the image-side surface of the fourth lens and the optical axis to a vertex of an effective radius of the image-side surface of the fourth lens and SAG52 is a distance along the optical axis from an intersection of an image-side surface of the fifth lens and the optical axis to a vertex of an effective radius of the image-side surface of the fifth lens. More specifically, SAG42 and SAG52 may further satisfy: 0.3<SAG42/SAG52<0.5. Satisfying 0.1<SAG42/SAG52<0.6 may better balance the relationship between the miniaturization of the optical imaging lens assembly and the relative illuminance of the off-axis field.

In an exemplary embodiment, the optical imaging lens assembly according to the present disclosure may satisfy: 0.5<ET4/CT4<1, where CT4 is a center thickness of the fourth lens along the optical axis and ET4 is an edge thickness of the fourth lens. More specifically, CT4 and ET4 may further satisfy: 0.75<ET4/CT4<1.0. Satisfying 0.5<ET4/CT4<1 may control the distortion of the optical imaging lens assembly to be within a certain range. And at the same time, satisfying 0.5<ET4/CT4<1 is also beneficial to reduce the error sensitivity when manufacturing the optical imaging lens assembly.

In an exemplary embodiment, the optical imaging lens assembly according to the present disclosure may satisfy: 0.7<f/f5<1.2, where f is a total effective focal length of the optical imaging lens assembly and f5 is an effective focal length of the fifth lens. More specifically, f and f5 may further satisfy: 0.85<f/f5<1.0. Satisfying 0.7<f/f5<1.2 may not only reasonably control the contribution of the fifth lens to the refractive power, but also compensate the high-level spherical aberration produced by the optical imaging lens assembly.

In an exemplary embodiment, the optical imaging lens assembly according to the present disclosure may satisfy: 0<f6/f2<1, where f2 is an effective focal length of the second lens and f6 is an effective focal length of the sixth lens. More specifically, f2 and f6 may further satisfy: 0.05<f6/f2<0.70. By satisfying 0<f6/f2<1, the refractive power of the optical imaging lens assembly may be reasonably assigned, which is beneficial to make the positive and negative spherical aberrations of the front-group lens and the rear-group lens offset each other.

In an exemplary embodiment, the optical imaging lens assembly according to the present disclosure may satisfy: 0.2<R1/f1<0.7, where f1 is an effective focal length of the first lens and R1 is a radius of curvature of the object-side surface of the first lens. More specifically, f1 and R1 may further satisfy: 0.35<R1/f1<0.60. Satisfying 0.2<R1/f1<0.7 may be not only beneficial to adjust the distribution of the refractive power of the optical imaging lens assembly, shorten the total length of the optical imaging lens assembly, and realize the miniaturization of the optical imaging lens assembly, but also balance the tolerance sensitivity of the optical imaging lens assembly.

In an exemplary embodiment, the optical imaging lens assembly according to the present disclosure may satisfy: 0.5<R7/R8<1.5, where R7 is a radius of curvature of the object-side surface of the fourth lens and R8 is a radius of curvature of the image-side surface of the fourth lens. More specifically, R7 and R8 may further satisfy: 0.5<R7/R8<1.35. Satisfying 0.5<R7/R8<1.5 may reduce the deflection angle of incident light, so that the optical imaging lens assembly may better achieve the deflection of the optical path.

In an exemplary embodiment, the optical imaging lens assembly according to the present disclosure may satisfy: −1.2<R10/f5<−0.2, where f5 is an effective focal length of the fifth lens and R10 is a radius of curvature of an image-side surface of the fifth lens. More specifically, f5 and R10 may further satisfy: −1<R10/f5<−0.5. Satisfying −1.2<R10/f5<−0.2 may control the third-order coma of the fifth lens to be within a reasonable range, and may compensate the amount of coma generated by the front-end optical lens, so that the optical imaging lens assembly has good imaging quality.

In an exemplary embodiment, the optical imaging lens assembly according to the present disclosure may satisfy: 0.1<f6/(R12−R11)<0.6, where f6 is an effective focal length of the sixth lens, R11 is a radius of curvature of the object-side surface of the sixth lens and R12 is a radius of curvature of an image-side surface of the sixth lens. More specifically, f6, R11 and R12 may further satisfy: 0.20<f6/(R12−R11)<0.40. Satisfying 0.1<f6/(R12−R11)<0.6 may be not only beneficial to better correct the chromatic aberration of the optical imaging lens assembly and improve the imaging quality, but also may effectively avoid the problem of increased tolerance sensitivity of the optical imaging lens assembly caused by excessive concentration of refractive power and excessive surface curvature.

In an exemplary embodiment, the optical imaging lens assembly according to the present disclosure may satisfy: $0.5 < CT2/T23 < 1$, where CT2 is a center thickness of the second lens along the optical axis and T23 is a spaced interval between the second lens and the third lens along the optical axis. More specifically, CT2 and T23 may further satisfy: $0.55 < CT2/T23 < 0.90$. Satisfying $0.5 < CT2/T23 < 1$ may effectively ensure the field curvature of the optical imaging lens assembly, so as to make the off-axis field area of the optical imaging lens assembly obtain good imaging quality.

In an exemplary embodiment, the optical imaging lens assembly according to the present disclosure may satisfy: $0.5 < T45/T56 < 1$, where T45 is a spaced interval between the fourth lens and the fifth lens along the optical axis and T56 is a spaced interval between the fifth lens and the sixth lens along the optical axis. More specifically, T45 and T56 may further satisfy: $0.55 < T45/T56 < 0.9$. Satisfying $0.5 < T45/T56 < 1$ may effectively control the contribution of field curvature at each field-of-view of the optical imaging lens assembly to be within a reasonable range.

In an exemplary embodiment, the optical imaging lens assembly according to the present disclosure may satisfy: $0.2 < CT3/CT5 < 0.7$, where CT3 is a center thickness of the third lens along the optical axis and CT5 is a center thickness of the fifth lens along the optical axis. More specifically, CT3 and CT5 may further satisfy: $0.4 < CT3/CT5 < 0.55$. Satisfying $0.2 < CT3/CT5 < 0.7$ may effectively control the distortion contribution of each field-of-view of the optical imaging lens assembly to be within a reasonable range, which is beneficial to improve the imaging quality of the optical imaging lens assembly.

In an exemplary embodiment, the third lens has refractive power, and an image-side surface thereof may be a concave surface. The image-side surface of the third lens is a concave surface, which is beneficial to improve the relative illuminance of the off-axis field of the optical imaging lens assembly and increase the field-of-view of the optical imaging lens assembly.

In an exemplary embodiment, the fifth lens may have positive refractive power, and an image-side surface thereof may be a convex surface. The fifth lens having positive refractive power with a convex image-side surface is beneficial to increase the field-of-view of the optical imaging lens assembly while compress the incident angle of light at the stop position and reduce pupil aberration, thereby improving imaging quality.

In an exemplary embodiment, the sixth lens may have negative refractive power, the object-side surface thereof may be a convex surface, and an image-side surface thereof may be a concave surface. The sixth lens having negative refractive power may effectively shorten the total length of the optical imaging lens assembly, thereby achieving the miniaturization and ultra-thinness of the lens assembly.

In an exemplary embodiment, the optical imaging lens assembly according to the present disclosure further includes a stop disposed between the object side and the first lens. Optionally, the above optical imaging lens assembly may further include an optical filter for correcting the color deviation and/or a protective glass for protecting the photosensitive element located on an imaging plane. The present disclosure provides an optical imaging lens assembly with the characteristics of large image plane, large aperture, ultra-thinness and the like. The optical imaging lens assembly according to the above embodiments of the present disclosure may employ a plurality of lenses, such as six lenses as described above. By properly assigning the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6584 | | | | |
| S1 | Aspheric | 1.9715 | 0.9566 | 1.55 | 56.1 | 3.55 | 0.3910 |
| S2 | Aspheric | −100.0000 | 0.0939 | | | | −99.0000 |
| S3 | Aspheric | −8.2162 | 0.2601 | 1.67 | 19.2 | −5.72 | −99.0000 |
| S4 | Aspheric | 7.4322 | 0.4440 | | | | 22.4862 |
| S5 | Aspheric | 5.1925 | 0.2532 | 1.62 | 26.0 | −331.45 | −7.8511 |
| S6 | Aspheric | 4.9700 | 0.3011 | | | | −7.7992 |
| S7 | Aspheric | 13.5081 | 0.3200 | 1.67 | 20.4 | −1136.50 | 9.2180 |
| S8 | Aspheric | 13.1457 | 0.5224 | | | | 36.0462 |
| S9 | Aspheric | 12.0856 | 0.5277 | 1.55 | 56.1 | 5.57 | −95.1875 |
| S10 | Aspheric | −4.0003 | 0.7788 | | | | −27.2155 |
| S11 | Aspheric | 15.4620 | 0.5000 | 1.54 | 55.9 | −3.76 | −18.7079 |
| S12 | Aspheric | 1.7666 | 0.7061 | | | | −9.4970 |
| S13 | Spherical | Infinite | 0.2100 | 1.52 | 64.2 | | |
| S14 | Spherical | Infinite | 0.2254 | | | | |
| S15 | Spherical | Infinite | | | | | |

In this example, a total effective focal length f of the optical imaging lens assembly is 5.49 mm, a total length TTL of the optical imaging lens assembly (that is, a distance along the optical axis from the object-side surface S1 of the first lens E1 to the imaging plane S15 of the optical imaging lens assembly) is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 | A14 | A16 | A18 | A20 |
|---|---|---|---|---|---|---|---|---|---|
| S1 | −7.0236E−03 | 2.4557E−03 | −6.1468E−03 | 2.1808E−03 | 3.4521E−03 | −5.5193E−03 | 3.1648E−03 | −8.5052E−04 | 7.9033E−05 |
| S2 | 1.0768E−02 | 2.5227E−02 | −6.5737E−02 | 1.1039E−01 | −1.3083E−01 | 9.9515E−02 | −4.6122E−02 | 1.1836E−02 | −1.2867E−03 |
| S3 | 3.2327E−02 | 3.3901E−02 | −1.0412E−01 | 1.7176E−01 | −1.9254E−01 | 1.4420E−01 | −6.7835E−02 | 1.8093E−02 | −2.0671E−03 |
| S4 | 3.7735E−02 | 2.6122E−02 | −9.9504E−02 | 1.6005E−01 | −1.2535E−01 | 1.6863E−02 | 5.0039E−02 | −3.6475E−02 | 8.2156E−03 |
| S5 | −8.6773E−02 | 6.7600E−02 | −1.9538E−01 | 3.5884E−01 | −4.9311E−01 | 4.4653E−01 | −2.4936E−01 | 7.6740E−02 | −9.6181E−03 |
| S6 | −9.6557E−02 | 8.0589E−02 | −1.2978E−01 | 1.3736E−01 | −1.1629E−01 | 6.9989E−02 | −2.6985E−02 | 6.0332E−03 | −5.4187E−04 |
| S7 | −1.1406E−01 | 7.6236E−02 | −6.4473E−02 | 7.6129E−02 | −7.3733E−02 | 4.4076E−02 | −1.4929E−02 | 2.6305E−03 | −1.8736E−04 |
| S8 | −1.1203E−01 | 4.7827E−02 | −2.2890E−02 | 1.8027E−02 | −1.3443E−02 | 6.8201E−03 | −2.0159E−03 | 3.0893E−04 | −1.8959E−05 |
| S9 | −1.3114E−02 | −2.9654E−02 | 2.4984E−02 | −1.5425E−02 | 6.5377E−03 | −1.8542E−03 | 3.3501E−04 | −3.3917E−05 | 1.4363E−06 |
| S10 | −4.8798E−02 | 1.3849E−02 | −2.2167E−03 | −4.4772E−04 | 4.7899E−04 | −1.3121E−04 | 1.5627E−05 | −7.4997E−07 | 6.8827E−09 |
| S11 | −2.2482E−01 | 1.0535E−01 | −2.8730E−02 | 5.3527E−03 | −6.9500E−04 | 6.1440E−05 | −3.5061E−06 | 1.1610E−07 | −1.6922E−09 |
| S12 | −9.0465E−02 | 3.6207E−02 | −9.9055E−03 | 1.9504E−03 | −2.7816E−04 | 2.7524E−05 | −1.7669E−06 | 6.5535E−08 | −1.0568E−09 |

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
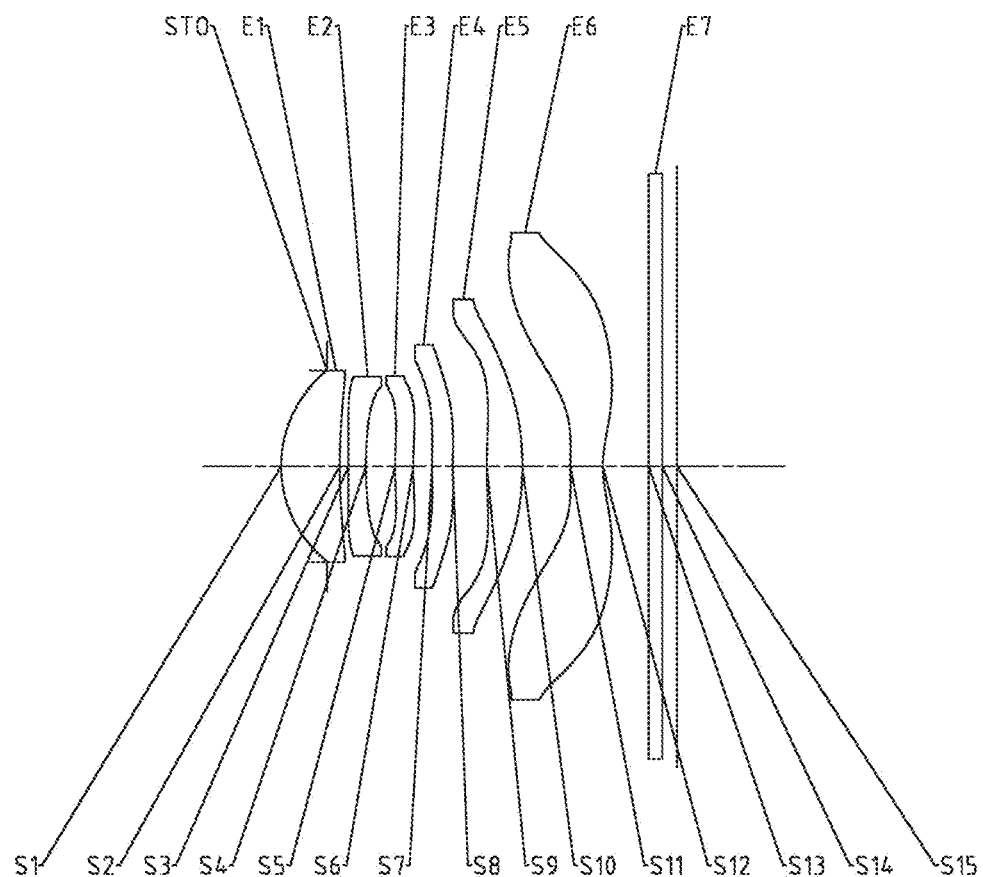
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 5.48 mm, a total length TTL of the optical imaging lens assembly is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7047 | | | | |
| S1 | Aspheric | 1.9211 | 0.9014 | 1.55 | 56.1 | 4.38 | 0.3704 |
| S2 | Aspheric | 8.1720 | 0.1345 | | | | −55.7660 |
| S3 | Aspheric | 119.3709 | 0.2704 | 1.67 | 19.2 | −10.25 | 98.9809 |
| S4 | Aspheric | 6.5590 | 0.4510 | | | | 10.5248 |
| S5 | Aspheric | 7.6960 | 0.2792 | 1.62 | 26.0 | −52.90 | −6.2866 |
| S6 | Aspheric | 6.1455 | 0.2883 | | | | 0.0000 |
| S7 | Aspheric | 14.4980 | 0.3204 | 1.67 | 20.4 | 142.73 | −63.0406 |
| S8 | Aspheric | 16.9539 | 0.5241 | | | | 46.5275 |
| S9 | Aspheric | 9.5579 | 0.5469 | 1.55 | 56.1 | 5.70 | −99.0000 |
| S10 | Aspheric | −4.5167 | 0.7405 | | | | −43.1581 |
| S11 | Aspheric | 14.0784 | 0.5001 | 1.54 | 55.9 | −3.78 | −24.9104 |
| S12 | Aspheric | 1.7522 | 0.7069 | | | | −9.6430 |
| S13 | Spherical | Infinite | 0.2100 | 1.52 | 64.2 | | |
| S14 | Spherical | Infinite | 0.2262 | | | | |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −4.1181E−03 | −6.7713E−03 | 1.4130E−02 | −2.0997E−02 | 1.6150E−02 | −5.9717E−03 | 6.6527E−05 | 6.1390E−04 | −1.3952E−04 |
| S2 | −1.3770E−02 | 2.4185E−02 | −4.9866E−02 | 9.9059E−02 | −1.2684E−01 | 9.8519E−02 | −4.5545E−02 | 1.1543E−02 | −1.2357E−03 |
| S3 | −3.2062E−02 | 6.7553E−02 | −7.4279E−02 | 1.0998E−01 | −1.4549E−01 | 1.2706E−01 | −6.6305E−02 | 1.8862E−02 | −2.2376E−03 |
| S4 | −1.0881E−02 | 4.7929E−02 | −2.6113E−04 | −5.4241E−02 | 9.1844E−02 | −9.6911E−02 | 7.4282E−02 | −3.5095E−02 | 7.4807E−03 |
| S5 | −1.0624E−01 | 1.2893E−01 | −3.7459E−01 | 7.4099E−01 | −1.0189E+00 | 9.1626E−01 | −5.1257E−01 | 1.6039E−01 | −2.1097E−02 |
| S6 | −1.1926E−01 | 1.2589E−01 | −2.5207E−01 | 3.6739E−01 | −3.8862E−01 | 2.7397E−01 | −1.2084E−01 | 3.0008E−02 | −3.1264E−03 |
| S7 | −1.1890E−01 | 8.0098E−02 | −6.0893E−02 | 4.1286E−02 | −1.9322E−02 | 2.6167E−03 | 2.3245E−03 | −1.1385E−03 | 1.5191E−04 |

TABLE 4-continued

| Surface number | A4 | A6 | A8 | A10 | A12 | A14 | A16 | A18 | A20 |
|---|---|---|---|---|---|---|---|---|---|
| S8 | −1.1574E−01 | 5.0400E−02 | −1.5963E−02 | 3.5916E−04 | 3.8049E−03 | −2.0460E−03 | 5.0635E−04 | −6.9380E−05 | 4.5786E−06 |
| S9 | −1.6473E−02 | −2.2702E−02 | 2.0255E−02 | −1.1293E−02 | 4.4494E−03 | −1.2661E−03 | 2.3384E−04 | −2.3668E−05 | 9.7483E−07 |
| S10 | −6.7228E−02 | 4.1071E−02 | −2.8195E−02 | 1.7326E−02 | −7.0157E−03 | 1.7231E−03 | −2.4833E−04 | 1.9360E−05 | −6.3061E−07 |
| S11 | −2.3950E−01 | 1.1905E−01 | −3.4199E−02 | 6.5243E−03 | −8.4316E−04 | 7.2758E−05 | −4.0086E−06 | 1.2744E−07 | −1.7786E−09 |
| S12 | −9.3248E−02 | 3.8392E−02 | −1.0206E−02 | 1.8448E−03 | −2.3365E−04 | 2.0411E−05 | −1.1709E−06 | 3.9624E−08 | −5.9571E−10 |

Figure 4A:
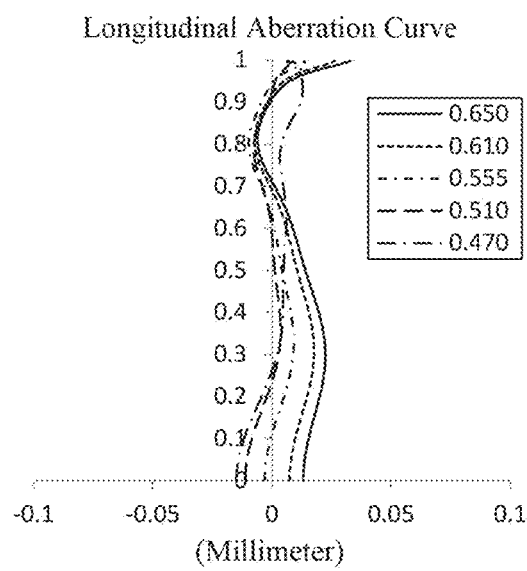
FIGS. 4A to 4D illustrate a longitudinal aberration curve, an astigmatic curve, a distortion curve, and a lateral color curve of the optical imaging lens assembly of the Example 2, respectively.
Figure 4B:
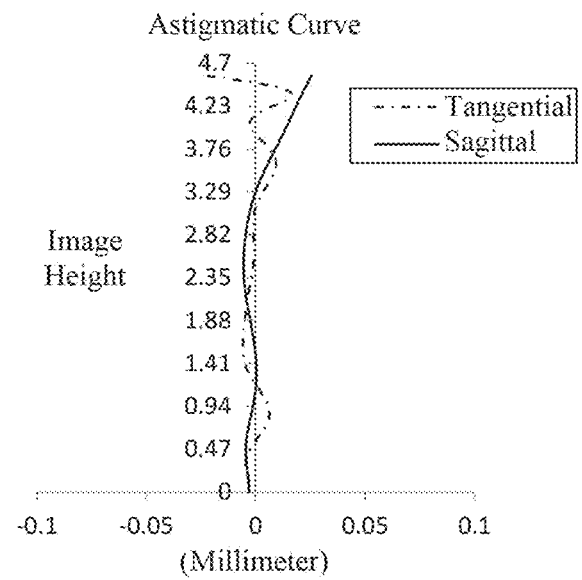
Figure 4C:
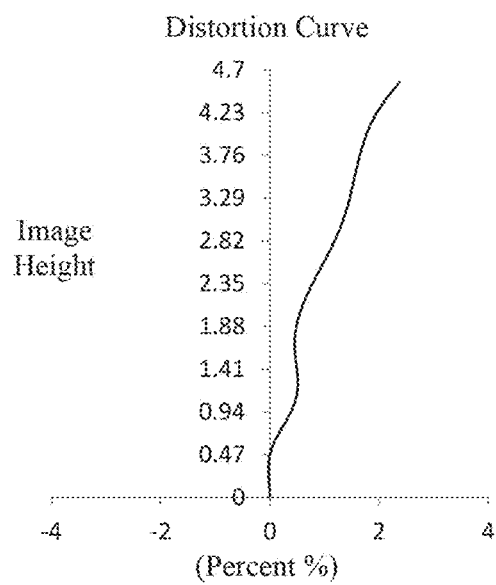
Figure 4D:
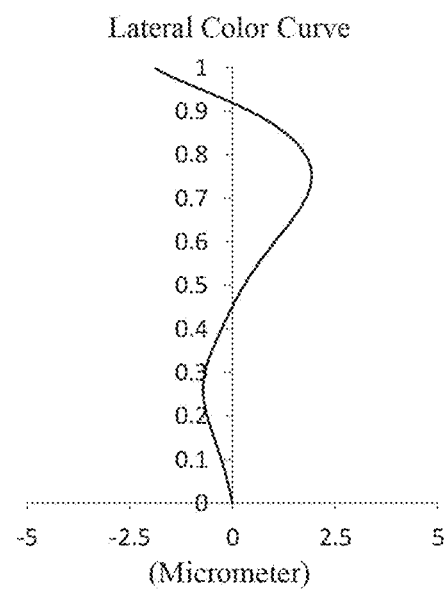

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 5.49 mm, a total length TTL of the optical imaging lens assembly is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7170 | | | | |
| S1 | Aspheric | 1.9283 | 0.9124 | 1.55 | 56.1 | 4.26 | 0.4202 |
| S2 | Aspheric | 9.4154 | 0.1542 | | | | −27.9565 |
| S3 | Aspheric | −17.7444 | 0.3368 | 1.67 | 19.2 | −11.66 | 0.0000 |
| S4 | Aspheric | 14.3500 | 0.4300 | | | | 3.9026 |
| S5 | Aspheric | −147.2150 | 0.2933 | 1.62 | 26.0 | −23.07 | −60.5890 |
| S6 | Aspheric | 15.8330 | 0.1542 | | | | 14.6488 |
| S7 | Aspheric | 12.2831 | 0.3200 | 1.67 | 20.4 | 37.10 | −98.3271 |
| S8 | Aspheric | 24.1572 | 0.6146 | | | | 71.9110 |
| S9 | Aspheric | 11.7104 | 0.5403 | 1.55 | 56.1 | 6.21 | −87.6913 |
| S10 | Aspheric | −4.6923 | 0.7069 | | | | −38.7300 |
| S11 | Aspheric | 14.5783 | 0.5000 | 1.54 | 55.9 | −3.72 | −22.7427 |
| S12 | Aspheric | 1.7358 | 0.7042 | | | | −9.6019 |
| S13 | Spherical | Infinite | 0.2100 | 1.52 | 64.2 | | |
| S14 | Spherical | Infinite | 0.2235 | | | | |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −7.1266E−03 | 5.4169E−03 | −2.1395E−02 | 4.1387E−02 | −5.3293E−02 | 4.3453E−02 | −2.1727E−02 | 6.0444E−03 | −7.2347E−04 |
| S2 | −5.7888E−03 | 1.8303E−02 | −6.0324E−02 | 1.2914E−01 | −1.6524E−01 | 1.2763E−01 | −5.8628E−02 | 1.4695E−02 | −1.5424E−03 |
| S3 | −4.4676E−04 | 2.7343E−02 | −5.8195E−02 | 1.2085E−01 | −1.6391E−01 | 1.3575E−01 | −6.6425E−02 | 1.7614E−02 | −1.9292E−03 |
| S4 | 1.4719E−02 | 7.4621E−03 | 8.4759E−02 | −3.4818E−01 | 7.3571E−01 | −9.0367E−01 | 6.4831E−01 | −2.5177E−01 | 4.1051E−02 |
| S5 | −8.1390E−02 | 1.4393E−01 | −5.8238E−01 | 1.4194E+00 | −2.2174E+00 | 2.1584E+00 | −1.2660E+00 | 4.0741E−01 | −5.4816E−02 |
| S6 | −1.0949E−01 | 5.6600E−02 | 6.6144E−02 | −3.6760E−01 | 6.2685E−01 | −6.0627E−01 | 3.4579E−01 | −1.0777E−01 | 1.4217E−02 |
| S7 | −1.3199E−01 | 6.8469E−02 | 1.4348E−02 | −8.5944E−02 | 9.8705E−02 | −7.4308E−02 | 3.8118E−02 | −1.1241E−02 | 1.3826E−03 |
| S8 | −1.0695E−01 | 4.8370E−02 | −2.1864E−02 | 2.0757E−02 | −2.3286E−02 | 1.5934E−02 | −5.8910E−03 | 1.1013E−03 | −8.1960E−05 |
| S9 | −1.2933E−02 | −2.6110E−02 | 2.5522E−02 | −1.4709E−02 | 5.4561E−03 | −1.3621E−03 | 2.1903E−04 | −1.9861E−05 | 7.5640E−07 |
| S10 | −5.3344E−02 | 1.9523E−02 | −6.5036E−03 | 4.1093E−03 | −1.9656E−03 | 5.2045E−04 | −7.5893E−05 | 5.7605E−06 | −1.7800E−07 |
| S11 | −2.4690E−01 | 1.2152E−01 | −3.4678E−02 | 6.6223E−03 | −8.6021E−04 | 7.4709E−05 | −4.1449E−06 | 1.3277E−07 | −1.8685E−09 |
| S12 | −9.6744E−02 | 3.9917E−02 | −1.0463E−02 | 1.8208E−03 | −2.1459E−04 | 1.6705E−05 | −8.1636E−07 | 2.2736E−08 | −2.7687E−10 |

Figure 6C:
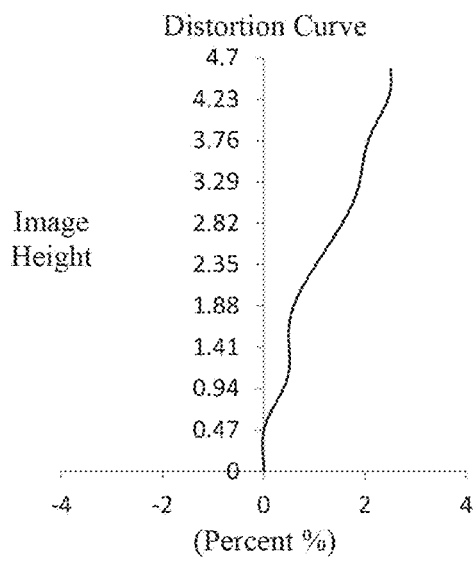
Figure 6D:
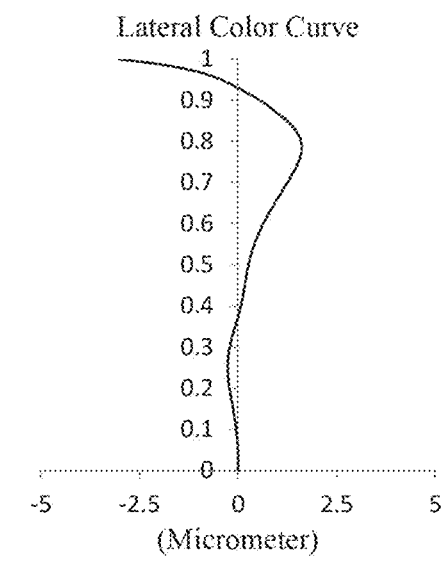

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
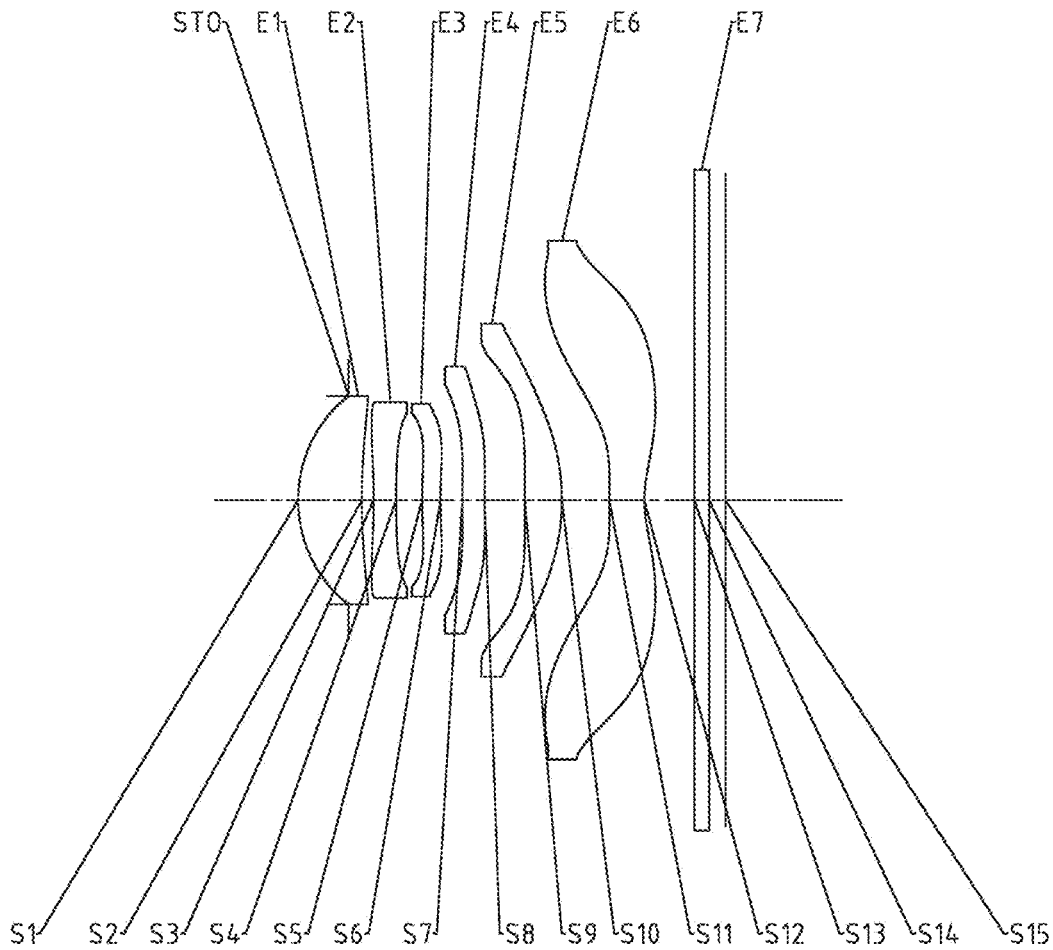
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 5.49 mm, a total length TTL of the optical imaging lens assembly is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| STO | Spherical | Infinite | −0.7188 | | | | |
| S1 | Aspheric | 1.9268 | 0.9098 | 1.55 | 56.1 | 4.28 | 0.2742 |
| S2 | Aspheric | 9.1047 | 0.1679 | | | | −23.4811 |
| S3 | Aspheric | −12.0642 | 0.3206 | 1.67 | 19.2 | −9.36 | 0.0000 |
| S4 | Aspheric | 13.5206 | 0.3720 | | | | 6.0652 |
| S5 | Aspheric | 6.4890 | 0.2624 | 1.62 | 26.0 | 1321.71 | −16.4839 |
| S6 | Aspheric | 6.4398 | 0.3111 | | | | −16.1639 |
| S7 | Aspheric | 16.5266 | 0.3200 | 1.67 | 20.4 | 87.62 | −19.1005 |
| S8 | Aspheric | 22.8715 | 0.5736 | | | | 89.1961 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S9 | Aspheric | −150.0000 | 0.5270 | 1.55 | 56.1 | 6.02 | 99.0000 |
| S10 | Aspheric | −3.2190 | 0.6785 | | | | −21.0141 |
| S11 | Aspheric | 12.9962 | 0.5000 | 1.54 | 55.9 | −3.66 | −21.3786 |
| S12 | Aspheric | 1.6837 | 0.7140 | | | | −8.9450 |
| S13 | Spherical | Infinite | 0.2100 | 1.52 | 64.2 | | |
| S14 | Spherical | Infinite | 0.2332 | | | | |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −2.2465E−03 | −6.8188E−03 | 1.7802E−02 | −2.8428E−02 | 2.6134E−02 | −1.3620E−02 | 3.4590E−03 | −1.7538E−04 | −6.2079E−05 |
| S2 | −1.2328E−02 | 2.5259E−02 | −6.1670E−02 | 1.2501E−01 | −1.5951E−01 | 1.2420E−01 | −5.7847E−02 | 1.4748E−02 | −1.5741E−03 |
| S3 | −1.0827E−02 | 5.6093E−02 | −8.6083E−02 | 1.3885E−01 | −1.7329E−01 | 1.4024E−01 | −6.8453E−02 | 1.8276E−02 | −2.0236E−03 |
| S4 | −3.5806E−03 | 6.3088E−02 | −4.8464E−02 | −4.9304E−02 | 2.5552E−01 | −4.0793E−01 | 3.3653E−01 | −1.4317E−01 | 2.5012E−02 |
| S5 | −1.1019E−01 | 1.4102E−01 | −4.7009E−01 | 1.0730E+00 | −1.6386E+00 | 1.5780E+00 | −9.2167E−01 | 2.9621E−01 | −3.9763E−02 |
| S6 | −1.0072E−01 | 5.1088E−02 | −2.7389E−02 | −8.3956E−02 | 2.0280E−01 | −2.2498E−01 | 1.3929E−01 | −4.6045E−02 | 6.4299E−03 |
| S7 | −8.5646E−02 | 3.1332E−02 | −2.9447E−02 | 5.4326E−02 | −6.5638E−02 | 4.3531E−02 | −1.5513E−02 | 2.7597E−03 | −1.8848E−04 |
| S8 | −7.5128E−02 | 1.3041E−02 | −3.8622E−04 | 8.4805E−03 | −1.3327E−02 | 9.1685E−03 | −3.2064E−03 | 5.5486E−04 | −3.7773E−05 |
| S9 | −8.8203E−03 | −3.0361E−02 | 2.3024E−02 | −1.1125E−02 | 3.7614E−03 | −9.4847E−04 | 1.6441E−04 | −1.5929E−05 | 6.1552E−07 |
| S10 | −7.4885E−02 | 4.7221E−02 | −3.1843E−02 | 1.9170E−02 | −7.6731E−03 | 1.8835E−03 | −2.7336E−04 | 2.1536E−05 | −7.0900E−07 |
| S11 | −2.3502E−01 | 1.2169E−01 | −3.7068E−02 | 7.4515E−03 | −9.9870E−04 | 8.8008E−05 | −4.8931E−06 | 1.5566E−07 | −2.1611E−09 |
| S12 | −9.1731E−02 | 3.9062E−02 | −1.0680E−02 | 1.9422E−03 | −2.4096E−04 | 2.0037E−05 | −1.0665E−06 | 3.2964E−08 | −4.5146E−10 |

Figure 8A:
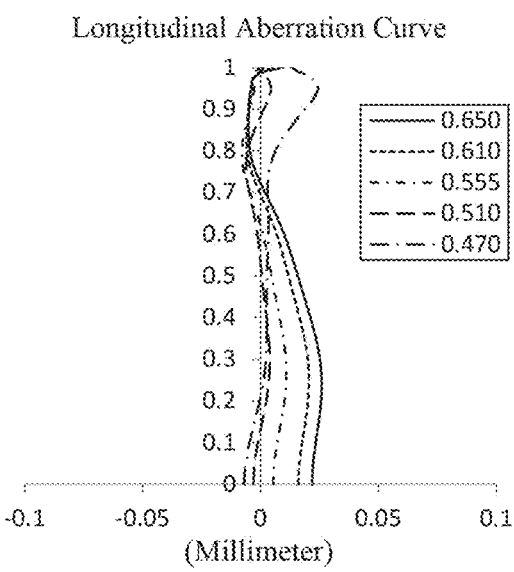
FIGS. 8A to 8D illustrate a longitudinal aberration curve, an astigmatic curve, a distortion curve, and a lateral color curve of the optical imaging lens assembly of the Example 4, respectively.
Figure 8B:
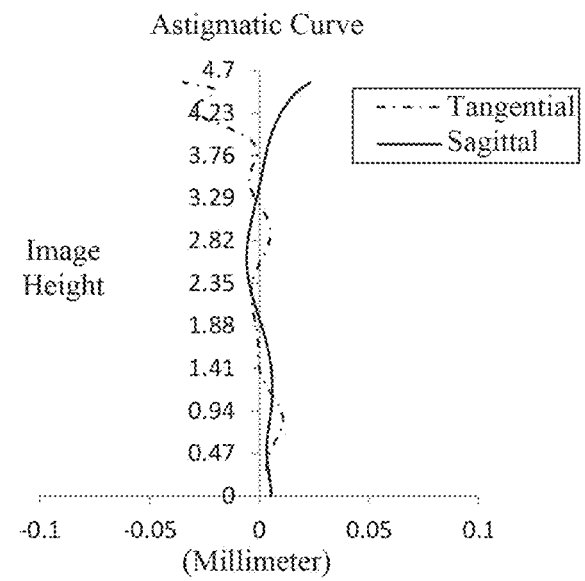
Figure 8C:
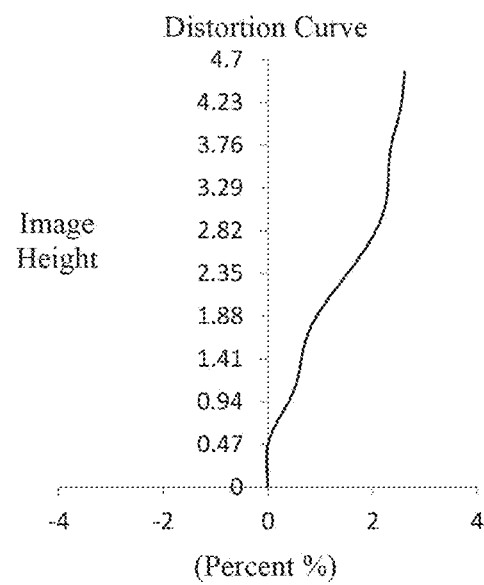
Figure 8D:
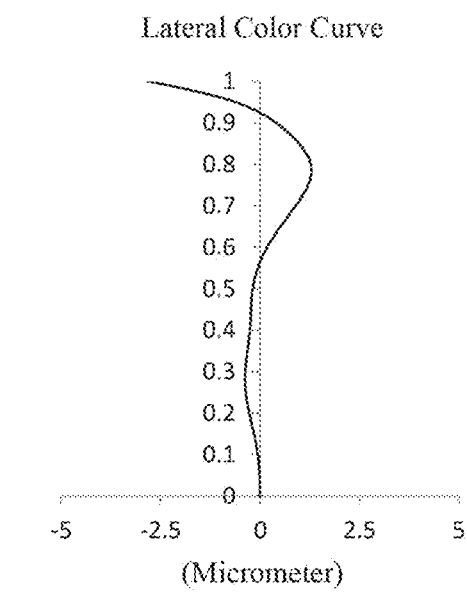

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
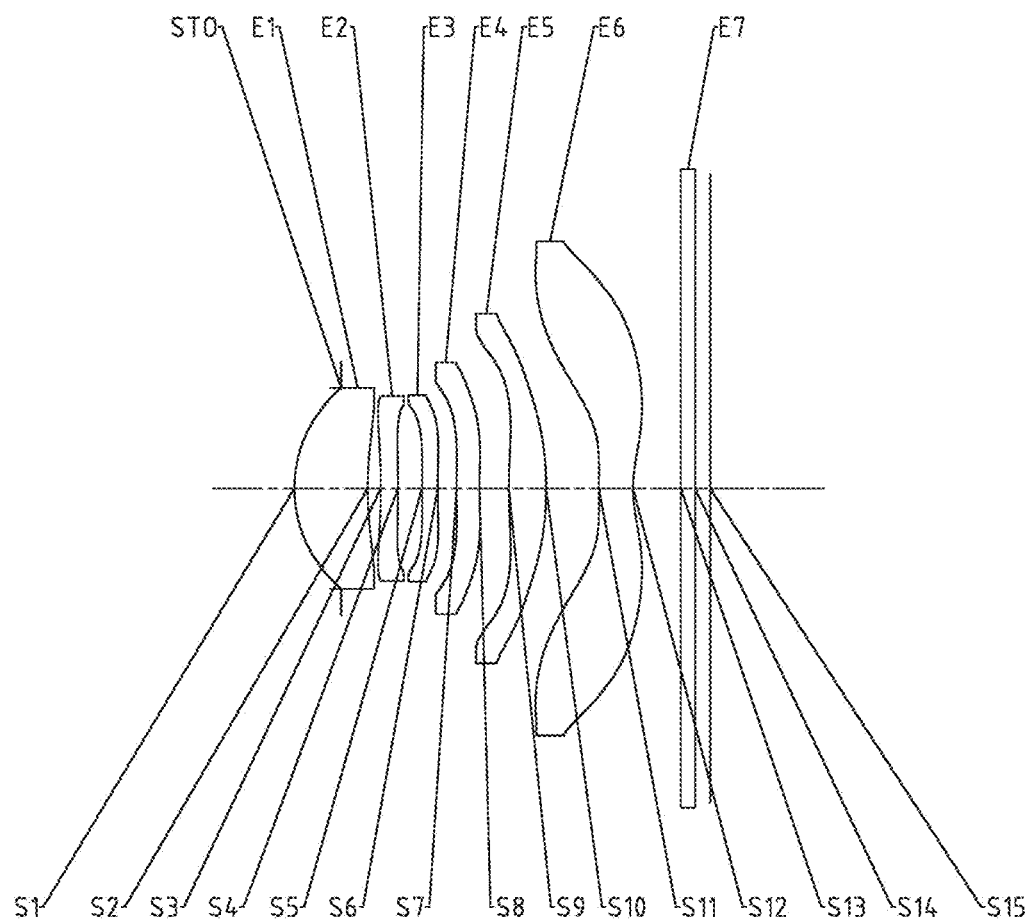
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 5.49 mm, a total length TTL of the optical imaging lens assembly is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6863 | | | | |
| S1 | Aspheric | 1.9370 | 1.0745 | 1.55 | 56.1 | 5.04 | 0.3722 |
| S2 | Aspheric | 5.2711 | 0.1918 | | | | −48.1127 |
| S3 | Aspheric | −12.7936 | 0.2534 | 1.67 | 19.2 | −40.00 | 0.0000 |
| S4 | Aspheric | −24.4261 | 0.3530 | | | | 66.9741 |
| S5 | Aspheric | 24.6087 | 0.2286 | 1.62 | 26.0 | −22.74 | 99.0000 |
| S6 | Aspheric | 8.9259 | 0.2782 | | | | −3.9627 |
| S7 | Aspheric | 11.1748 | 0.3357 | 1.67 | 20.4 | −52.22 | −99.0000 |
| S8 | Aspheric | 8.3570 | 0.4304 | | | | −87.3503 |
| S9 | Aspheric | 7.3859 | 0.5486 | 1.55 | 56.1 | 5.57 | −92.5096 |
| S10 | Aspheric | −5.0378 | 0.7733 | | | | −56.6608 |
| S11 | Aspheric | 12.0546 | 0.5000 | 1.54 | 55.9 | −4.04 | −28.4442 |
| S12 | Aspheric | 1.8128 | 0.7018 | | | | −9.8865 |
| S13 | Spherical | Infinite | 0.2100 | 1.52 | 64.2 | | |
| S14 | Spherical | Infinite | 0.2210 | | | | |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −6.5635E−03 | 4.9892E−04 | −1.0957E−03 | −6.3282E−03 | 1.1792E−02 | −9.9584E−03 | 4.2116E−03 | −8.3723E−04 | 4.7146E−05 |
| S2 | 2.6865E−02 | −2.5008E−02 | −2.4481E−02 | 9.9061E−02 | −1.6012E−01 | 1.4662E−01 | −7.7890E−02 | 2.2316E−02 | −2.6565E−03 |
| S3 | −1.9883E−02 | 3.6186E−02 | −6.8566E−02 | 1.6737E−01 | −2.4887E−01 | 2.2488E−01 | −1.2090E−01 | 3.5384E−02 | −4.2873E−03 |
| S4 | −5.5878E−03 | 3.3048E−02 | 3.1660E−02 | −1.6716E−01 | 3.9709E−01 | −5.2226E−01 | 3.9211E−01 | −1.5762E−01 | 2.6470E−02 |
| S5 | −1.1019E−01 | 1.7412E−01 | −5.6389E−01 | 1.2502E+00 | −1.8562E+00 | 1.7571E+00 | −1.0160E+00 | 3.2492E−01 | −4.3720E−02 |
| S6 | −1.1744E−01 | 1.2108E−01 | −1.6746E−01 | 1.2528E−01 | −1.7895E−02 | −6.9628E−02 | 7.0822E−02 | −2.9311E−02 | 4.7291E−03 |
| S7 | −1.2442E−01 | 5.3962E−02 | 5.6489E−02 | −1.7504E−01 | 2.0720E−01 | −1.4541E−01 | 6.1615E−02 | −1.4445E−02 | 1.4335E−03 |
| S8 | −1.2248E−01 | 6.2812E−02 | −2.6796E−02 | 9.3682E−03 | −4.1058E−03 | 2.2063E−03 | −7.1773E−04 | 1.0649E−04 | −5.2754E−06 |
| S9 | −1.3700E−02 | −2.7890E−02 | 2.3685E−02 | −1.1569E−02 | 3.9568E−03 | −1.0018E−03 | 1.6873E−04 | −1.5736E−05 | 5.9726E−07 |
| S10 | −6.3576E−02 | 3.9138E−02 | −2.6327E−02 | 1.5766E−02 | −6.0571E−03 | 1.3847E−03 | −1.8410E−04 | 1.3200E−05 | −3.9527E−07 |
| S11 | −2.2839E−01 | 1.0776E−01 | −2.9494E−02 | 5.4502E−03 | −6.9486E−04 | 6.0098E−05 | −3.3614E−06 | 1.0956E−07 | −1.5788E−09 |
| S12 | −9.2684E−02 | 3.6712E−02 | −9.4526E−03 | 1.6623E−03 | −2.0446E−04 | 1.7195E−05 | −9.3485E−07 | 2.9427E−08 | −4.0471E−10 |

Figures 10A, 10B:
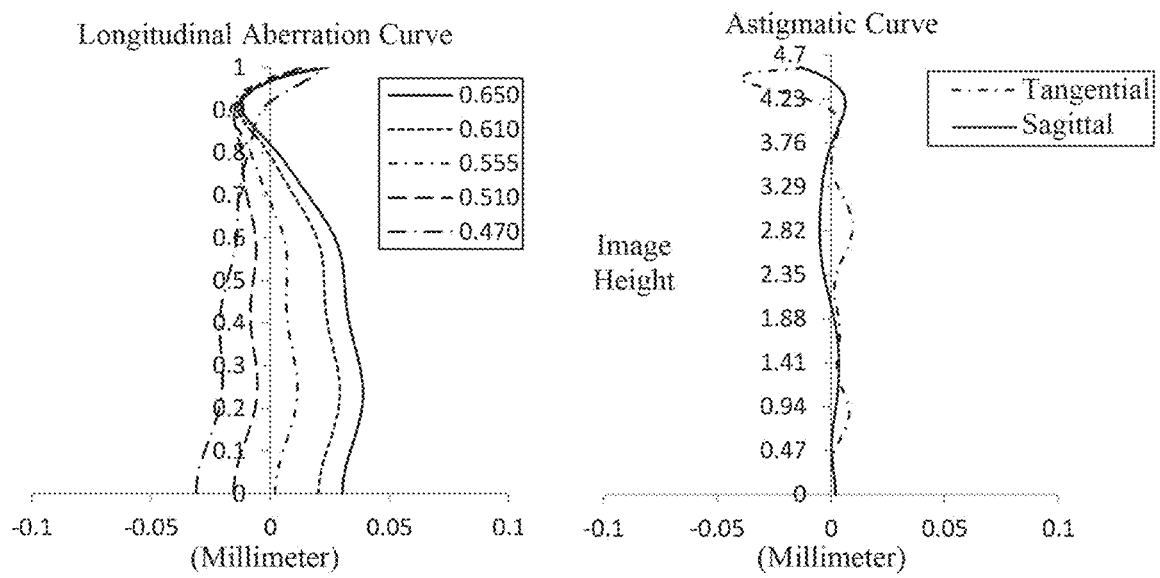
FIGS. 10A to 10D illustrate a longitudinal aberration curve, an astigmatic curve, a distortion curve, and a lateral color curve of the optical imaging lens assembly of the Example 5, respectively.
Figures 10C, 10D:
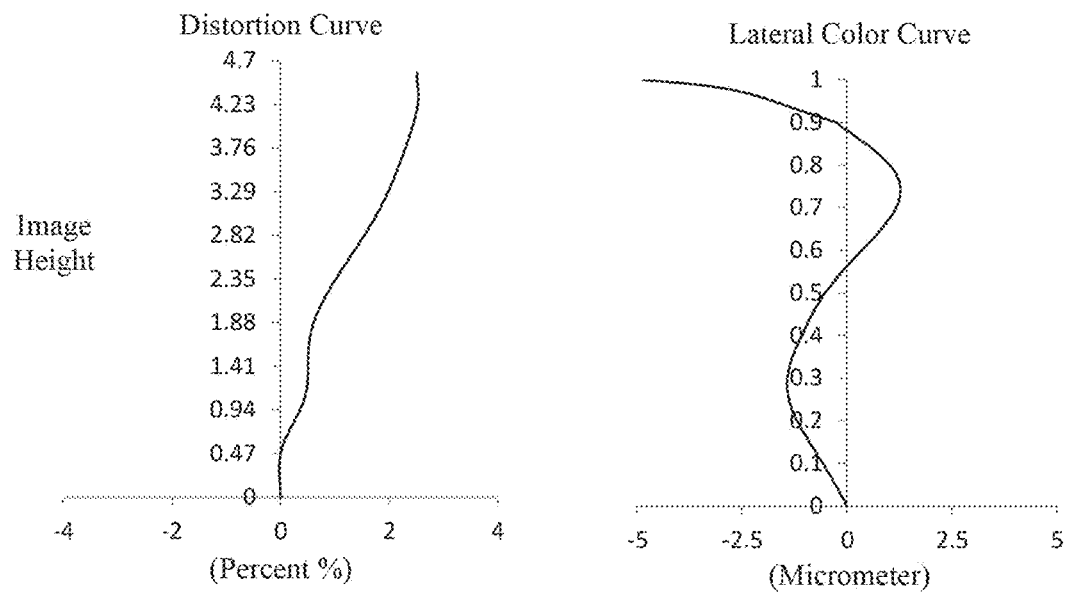

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

Figure 11:
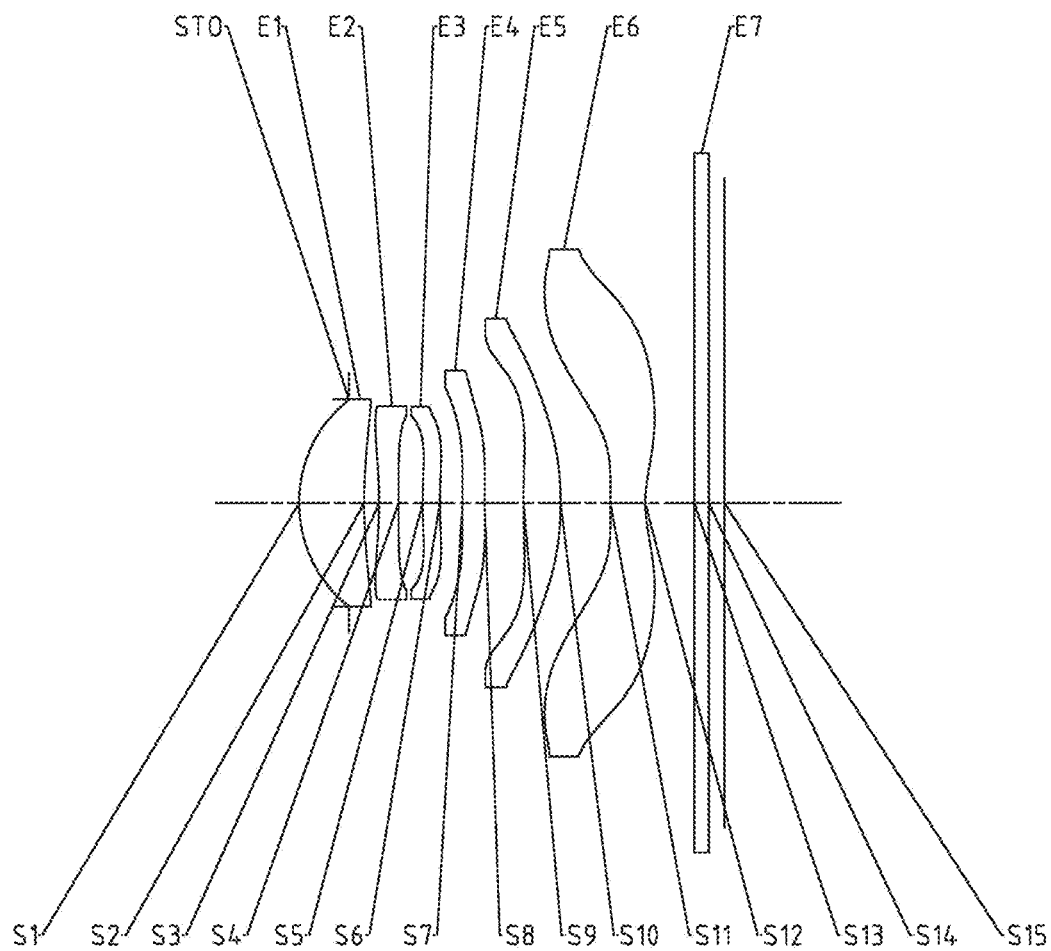
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 5.48 mm, a total length TTL of the optical imaging lens assembly is 6.10 mm, half of a diagonal length ImgH of an effective pixel area on the imaging plane S15 of the optical imaging lens assembly is 4.64 mm, half of a maximal field-of-view Semi-FOV of the optical imaging lens assembly is 39.5°, and the ratio f/EPD of the total effective focal length f of the optical imaging lens assembly to an entrance pupil diameter EPD of the optical imaging lens assembly is 1.85.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

In view of the above, examples 1 to 6 respectively satisfy the relationship shown in Table 13.

TABLE 13

| Condition/Example | 1 | 2 | 3 | 4 | 5 | 6 |
|---|---|---|---|---|---|---|
| TTL/ImgH | 1.32 | 1.32 | 1.32 | 1.32 | 1.32 | 1.32 |
| f*tan (Semi-FOV) (mm) | 4.53 | 4.52 | 4.52 | 4.52 | 4.52 | 4.52 |

TABLE 11

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7146 | | | | |
| S1 | Aspheric | 1.9288 | 0.9341 | 1.55 | 56.1 | 4.41 | 0.3431 |
| S2 | Aspheric | 8.0447 | 0.2126 | | | | −32.6617 |
| S3 | Aspheric | −6.9491 | 0.2816 | 1.67 | 19.2 | −10.58 | −15.5686 |
| S4 | Aspheric | −230.2171 | 0.3450 | | | | 99.0000 |
| S5 | Aspheric | 6.2513 | 0.2469 | 1.62 | 26.0 | 3505.00 | −28.5295 |
| S6 | Aspheric | 6.1746 | 0.3216 | | | | −17.7421 |
| S7 | Aspheric | 21.2414 | 0.3200 | 1.67 | 20.4 | −1196.35 | 94.3262 |
| S8 | Aspheric | 20.5656 | 0.5561 | | | | 87.4786 |
| S9 | Aspheric | 11.0234 | 0.5331 | 1.55 | 56.1 | 6.15 | −98.2944 |
| S10 | Aspheric | −4.7447 | 0.7144 | | | | −36.9339 |
| S11 | Aspheric | 14.0396 | 0.5000 | 1.54 | 55.9 | −3.81 | −22.7422 |
| S12 | Aspheric | 1.7639 | 0.7024 | | | | −9.7993 |
| S13 | Spherical | Infinite | 0.2100 | 1.52 | 64.2 | | |
| S14 | Spherical | Infinite | 0.2217 | | | | |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −5.1529E−03 | 1.5807E−03 | −5.4644E−03 | 7.3544E−03 | −8.2257E−03 | 6.9990E−03 | −4.1252E−03 | 1.3924E−03 | −2.0336E−04 |
| S2 | −4.3576E−03 | 1.8043E−02 | −5.8773E−02 | 1.2741E−01 | −1.6736E−01 | 1.3315E−01 | −6.3172E−02 | 1.6360E−02 | −1.7679E−03 |
| S3 | −6.6413E−03 | 6.2618E−02 | −1.1738E−01 | 2.1195E−01 | −2.7503E−01 | 2.2658E−01 | −1.1203E−01 | 3.0261E−02 | −3.3971E−03 |
| S4 | 1.1493E−03 | 5.6529E−02 | 1.2858E−02 | −2.4666E−01 | 6.1396E−01 | −7.9977E−01 | 5.9057E−01 | −2.3298E−01 | 3.8315E−02 |
| S5 | −1.1841E−01 | 1.5662E−01 | −4.8643E−01 | 1.0456E+00 | −1.5350E+00 | 1.4375E+00 | −8.2047E−01 | 2.5816E−01 | −3.3903E−02 |
| S6 | −1.0763E−01 | 6.4069E−02 | −2.8598E−02 | −1.2186E−01 | 2.7471E−01 | −2.9233E−01 | 1.7515E−01 | −5.6305E−02 | 7.6443E−03 |
| S7 | −1.0194E−01 | 6.8287E−02 | −6.7829E−02 | 8.4121E−02 | −8.5434E−02 | 5.3171E−02 | −1.8346E−02 | 3.1772E−03 | −2.0980E−04 |
| S8 | −1.0263E−01 | 5.5827E−02 | −4.6028E−02 | 4.7540E−02 | −3.8909E−02 | 2.0537E−02 | −6.2987E−03 | 1.0132E−03 | −6.5995E−05 |
| S9 | −2.0004E−02 | −1.7237E−02 | 1.5906E−02 | −8.2573E−03 | 2.8485E−03 | −7.4228E−04 | 1.3569E−04 | −1.4067E−05 | 5.9646E−07 |
| S10 | −5.9546E−02 | 2.8496E−02 | −1.5076E−02 | 9.4353E−03 | −4.0403E−03 | 1.0143E−03 | −1.4556E−04 | 1.1114E−05 | −3.5058E−07 |
| S11 | −2.4950E−01 | 1.2728E−01 | −3.8055E−02 | 7.5632E−03 | −1.0091E−03 | 8.8906E−05 | −4.9521E−06 | 1.5795E−07 | −2.1987E−09 |
| S12 | −9.8467E−02 | 4.1941E−02 | −1.1274E−02 | 1.9880E−03 | −2.3510E−04 | 1.8193E−05 | −8.7244E−07 | 2.3448E−08 | −2.7119E−10 |

Figure 12A:
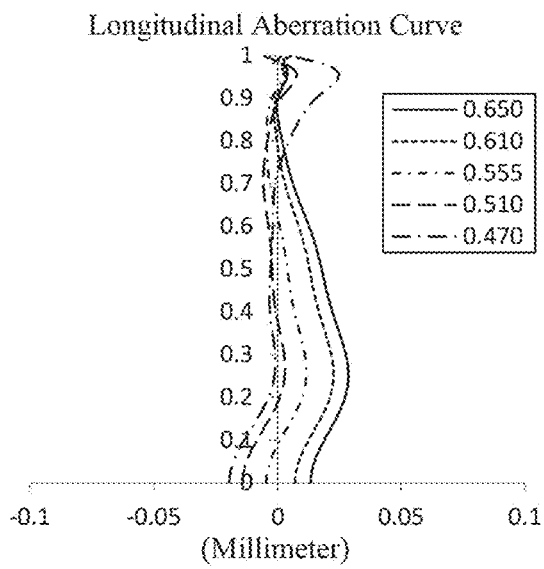
FIGS. 12A to 12D illustrate a longitudinal aberration curve, an astigmatic curve, a distortion curve, and a lateral color curve of the optical imaging lens assembly of the Example 6, respectively.
Figure 12B:
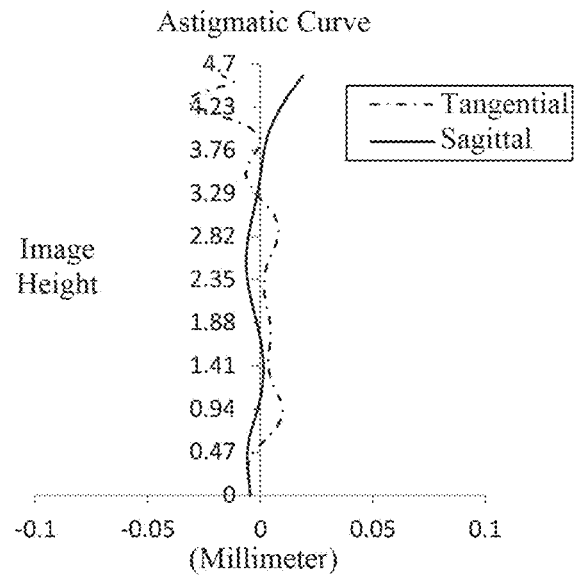
Figure 12C:
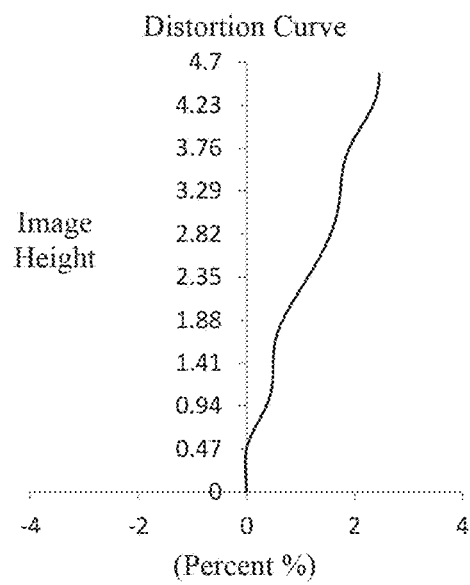
Figure 12D:
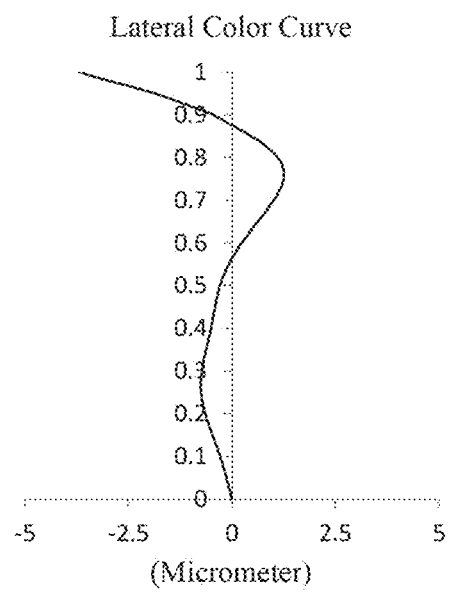

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

TABLE 13-continued

| Condition/Example | 1 | 2 | 3 | 4 | 5 | 6 |
|---|---|---|---|---|---|---|
| ET1/CT1 | 0.32 | 0.31 | 0.30 | 0.30 | 0.45 | 0.33 |
| SAG42/SAG52 | 0.31 | 0.42 | 0.34 | 0.33 | 0.48 | 0.36 |
| ET4/CT4 | 0.80 | 0.84 | 0.97 | 0.89 | 0.86 | 0.90 |
| f/f5 | 0.99 | 0.96 | 0.88 | 0.91 | 0.98 | 0.89 |
| f6/f2 | 0.66 | 0.37 | 0.32 | 0.39 | 0.10 | 0.36 |
| R1/f1 | 0.55 | 0.44 | 0.45 | 0.45 | 0.38 | 0.44 |
| R7/R8 | 1.03 | 0.86 | 0.51 | 0.72 | 1.34 | 1.03 |
| R10/f5 | −0.72 | −0.79 | −0.76 | −0.53 | −0.90 | −0.77 |
| f6/(R12−R11) | 0.27 | 0.31 | 0.29 | 0.32 | 0.39 | 0.31 |
| CT2/T23 | 0.59 | 0.60 | 0.78 | 0.86 | 0.72 | 0.82 |

TABLE 13-continued

| Condition/Example | 1 | 2 | 3 | 4 | 5 | 6 |
|---|---|---|---|---|---|---|
| T45/T56 | 0.67 | 0.71 | 0.87 | 0.85 | 0.56 | 0.78 |
| CT3/CT5 | 0.48 | 0.51 | 0.54 | 0.50 | 0.42 | 0.46 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the invention scope of the present disclosure is not limited to the technical solutions formed by the particular combinations of the above technical features. The invention scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having positive refractive power with a convex object-side surface;
   a second lens having a negative refractive power;
   a third lens having refractive power;
   a fourth lens having refractive power with a convex object-side surface and a concave image-side surface;
   a fifth lens having positive refractive power; and
   a sixth lens having negative refractive power with a convex object-side surface,
   wherein TTL/ImgH<1.6,
   4.5 mm<f*tan(Semi-FOV)<7 mm,
   0.5<T45/T56<1, and
   0.27<f6/(R12-R11)<0.39,
   where TTL is a distance along the optical axis from the object-side surface of the first lens to an imaging plane of the optical imaging lens assembly, ImgH is half of a diagonal length of an effective pixel area on the imaging plane, f is a total effective focal length of the optical imaging lens assembly, Semi-FOV is half of a maximal field-of-view of the optical imaging lens assembly, T45 is a spaced interval between the fourth lens and the fifth lens along the optical axis, T56 is a spaced interval between the fifth lens and the sixth lens along the optical axis, f6 is an effective focal length of the sixth lens, R11 is a radius of curvature of the object-side surface of the sixth lens and R12 is a radius of curvature of an image-side surface of the sixth lens.

2. The optical imaging lens assembly according to claim 1, wherein 0.2<ET1/CT1<0.7,
   where CT1 is a center thickness of the first lens along the optical axis and ET1 is an edge thickness of the first lens.

3. The optical imaging lens assembly according to claim 1, wherein 0.1<SAG42/SAG52<0.6,
   where SAG42 is a distance along the optical axis from an intersection of the image-side surface of the fourth lens and the optical axis to a vertex of an effective radius of the image-side surface of the fourth lens, and SAG52 is a distance along the optical axis from an intersection of an image-side surface of the fifth lens and the optical axis to a vertex of an effective radius of the image-side surface of the fifth lens.

4. The optical imaging lens assembly according to claim 1, wherein 0.5<ET4/CT4<1,
   where CT4 is a center thickness of the fourth lens along the optical axis and ET4 is an edge thickness of the fourth lens.

5. The optical imaging lens assembly according to claim 1, wherein 0.7<f/f5<1.2,
   where f is the total effective focal length of the optical imaging lens assembly and f5 is an effective focal length of the fifth lens.

6. The optical imaging lens assembly according to claim 1, wherein 0<f6/f2<1,
   where f2 is an effective focal length of the second lens and f6 is an effective focal length of the sixth lens.

7. The optical imaging lens assembly according to claim 1, wherein 0.2<R1/f1<0.7,
   where f1 is an effective focal length of the first lens and R1 is a radius of curvature of the object-side surface of the first lens.

8. The optical imaging lens assembly according to claim 1, wherein 0.5<R7/R8<1.5,
   where R7 is a radius of curvature of the object-side surface of the fourth lens and R8 is a radius of curvature of the image-side surface of the fourth lens.

9. The optical imaging lens assembly according to claim 1, wherein −1.2<R10/f5<−0.2,
   where f5 is an effective focal length of the fifth lens and R10 is a radius of curvature of an image-side surface of the fifth lens.

10. The optical imaging lens assembly according to claim 1, wherein 0.5<CT2/T23<1,
    where CT2 is a center thickness of the second lens along the optical axis and T23 is a spaced interval between the second lens and the third lens along the optical axis.

11. The optical imaging lens assembly according to claim 1, wherein 0.2<CT3/CT5<0.7,
    where CT3 is a center thickness of the third lens along the optical axis and CT5 is a center thickness of the fifth lens along the optical axis.

12. The optical imaging lens assembly according to claim 1, wherein an image-side surface of the third lens is a concave surface,
    an image-side surface of the fifth lens is a convex surface, and
    an image-side surface of the sixth lens is a concave surface.

13. The optical imaging lens assembly according to claim 1, wherein f/EPD<1.9,
    where f is the total effective focal length of the optical imaging lens assembly and EPD is an entrance pupil diameter of the optical imaging lens assembly.

14. An optical imaging lens assembly, sequentially from an object side to an image side of the optical imaging lens assembly along an optical axis, comprising:
    a first lens having positive refractive power with a convex object-side surface;
    a second lens having a negative refractive power;
    a third lens having refractive power;
    a fourth lens having refractive power with a convex object-side surface and a concave image-side surface;
    a fifth lens having positive refractive power; and
    a sixth lens having negative refractive power with a convex object-side surface,
    wherein 0.7<f/f5<1.2,
    4.5 mm<f*tan(Semi-FOV)<7 mm, $0.5 < T45/T56 < 1$, and $0.27 < f6/(R12-R11) < 0.39$, where f is a total effective focal length of the optical imaging lens assembly, f5 is an effective focal length of the fifth lens, Semi-FOV is half of a maximal field-of-view of the optical imaging lens assembly, T45 is a spaced interval between the fourth lens and the fifth lens along the optical axis, T56 is a spaced interval between the fifth lens and the sixth lens along the optical axis, f6 is an effective focal length of the sixth lens, R11 is a radius of curvature of the object-side surface of the sixth lens and R12 is a radius of curvature of an image-side surface of the sixth lens.

15. The optical imaging lens assembly according to claim 14, wherein $0 < f6/f2 < 1$, where f2 is an effective focal length of the second lens and f6 is an effective focal length of the sixth lens.

16. The optical imaging lens assembly according to claim 14, wherein $0.2 < R1/f1 < 0.7$, where f1 is an effective focal length of the first lens and R1 is a radius of curvature of the object-side surface of the first lens.

17. The optical imaging lens assembly according to claim 14, wherein $-1.2 < R10/f5 < -0.2$, where f5 is the effective focal length of the fifth lens and R10 is a radius of curvature of an image-side surface of the fifth lens.

\* \* \* \* \*